(12) United States Patent
Sheem et al.

(10) Patent No.: US 8,241,794 B2
(45) Date of Patent: *Aug. 14, 2012

(54) ACTIVE MATERIAL FOR RECHARGEABLE LITHIUM BATTERY AND RECHARGEABLE LITHIUM BATTERY INCLUDING SAME

(75) Inventors: Kyou-Yoon Sheem, Suwon-si (KR); Sung-Soo Kim, Suwon-si (KR); Joon-Sup Kim, Suwon-si (KR); Yong-Mook Kang, Suwon-si (KR); Min-Seok Sung, Suwon-si (KR); Young-Hee Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,910

(22) Filed: Dec. 16, 2011

(65) Prior Publication Data

US 2012/0094180 A1    Apr. 19, 2012

Related U.S. Application Data

(63) Continuation of application No. 11/607,817, filed on Nov. 30, 2006, now Pat. No. 8,105,716.

(30) Foreign Application Priority Data

Nov. 30, 2005 (KR) .................. 10-2005-0015824

(51) Int. Cl.
*H01M 4/131* (2010.01)
*H01M 4/133* (2010.01)
*H01M 4/134* (2010.01)
*H01M 4/485* (2010.01)
*H01M 4/583* (2010.01)

(52) U.S. Cl. ............. 429/231.8; 429/231.1; 429/231.95; 429/232

(58) Field of Classification Search .................. None
See application file for complete search history.

(56) References Cited

U.S. PATENT DOCUMENTS

| | | | |
|---|---|---|---|
| 5,292,601 | A | 3/1994 | Sugeno et al. |
| 5,705,291 | A | 1/1998 | Amatucci et al. |
| 5,910,382 | A | 6/1999 | Goodenough et al. |
| 6,174,623 | B1 | 1/2001 | Shackle |

(Continued)

FOREIGN PATENT DOCUMENTS

JP        09-055210        2/1997

(Continued)

OTHER PUBLICATIONS

U.S. Office action dated Oct. 28, 2009 for related U.S. Appl. No. 11/604,099.

(Continued)

*Primary Examiner* — Jonathan Crepeau
(74) *Attorney, Agent, or Firm* — Christie, Parker & Hale, LLP

(57) ABSTRACT

The present invention relates to an active material for a rechargeable lithium battery and a rechargeable lithium battery including the same. The active material includes an active material and a fiber-shaped or tube-shaped carbon conductive material attached to the surface of the active material. The active material includes a conductive shell including a fiber-shaped or tube-shaped carbon conductive material and increases discharge capacity due to improved conductivity and improves cycle-life efficiency by maintaining paths between active material particles during charge and discharge cycles.

18 Claims, 4 Drawing Sheets

U.S. PATENT DOCUMENTS

| | | |
|---|---|---|
| 6,255,019 B1 | 7/2001 | Sakamoto et al. |
| 6,258,483 B1 | 7/2001 | Abe |
| 6,338,917 B1 | 1/2002 | Maeda et al. |
| 6,440,610 B1 | 8/2002 | Sheem et al. |
| 6,485,858 B1 | 11/2002 | Baker et al. |
| 6,492,061 B1 | 12/2002 | Gauthier et al. |
| 6,534,217 B2 | 3/2003 | Koga et al. |
| 6,537,701 B1 | 3/2003 | Nimon et al. |
| 6,548,210 B1 | 4/2003 | Shinyama et al. |
| 6,558,841 B1 | 5/2003 | Nakagiri et al. |
| 6,562,516 B2 | 5/2003 | Ohta et al. |
| 6,573,006 B2 | 6/2003 | Nishiyama et al. |
| 2001/0018148 A1 | 8/2001 | Ohta et al. |
| 2005/0233213 A1 | 10/2005 | Lee et al. |
| 2007/0122712 A1 | 5/2007 | Kang et al. |

FOREIGN PATENT DOCUMENTS

| | | |
|---|---|---|
| JP | 11-016566 | 1/1999 |
| JP | 11-185758 | 7/1999 |
| JP | 11-283629 | 10/1999 |
| JP | 11-307116 | 11/1999 |
| JP | 2001-202958 | 7/2001 |
| JP | 2005-044672 | 2/2005 |
| KR | 10-2003-0013553 | 2/2003 |
| KR | 2003-0021112 | 3/2003 |
| KR | 2003-0028241 | 4/2003 |
| KR | 10-2004-0026207 | 3/2004 |
| KR | 10-2004-0096203 | 11/2004 |
| KR | 10-2005-0013841 | 2/2005 |

OTHER PUBLICATIONS

U.S. Office action dated Apr. 16, 2010 for related U.S. Appl. No. 11/604,099.

U.S. Office action dated Apr. 13, 2011, for cross reference U.S. Appl. No. 11/604,099.

U.S. Office action dated Sep. 28, 2011, for cross-reference U.S. Appl. No. 11/604,099.

U.S. Office action dated Apr. 11, 2012, for cross reference U.S. Appl. No, 11/604,099, (11 pages).

U.S. Notice of Allowance dated Sep. 23, 2011, for parent U.S. Appl. No. 11/607,817, (8 pages).

ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application is a continuation of U.S. application Ser. No. 11/607,817, filed Nov. 30, 2006, which issued as U.S. Pat. No. 8,105,716 on Jan. 31, 2012, and which claims priority to and the benefit of Korean Patent Application No. 10-2005-0115824, filed in the Korean Intellectual Property Office on Nov. 30, 2005, the entire contents of which are incorporated herein by reference.

BACKGROUND OF THE INVENTION (a) Field of the Invention

The present invention relates to an active material for a rechargeable lithium battery, and a rechargeable lithium battery including the same, and more particularly, the present invention relates to an active material for a rechargeable lithium battery having excellent high rate characteristics and/or cycle-life characteristics, and including the same.

(b) Description of the Related Art

In recent times, due to reductions in size and weight of portable electronic equipment in accordance with developments in the electronics industries, such portable electronic equipment has increasingly been used. A battery having a high energy density for a power source of such a portable electronic equipment is needed and thus research into rechargeable lithium batteries has been actively made.

For a positive active material of a rechargeable lithium battery, lithium-transition element oxides have been used, and for a negative active material, carbon-based active materials, silicon, tin, or alloys alloyed with other metals have been used.

The above non-carbon-based active materials such as lithium-transition elements oxide, or silicon, tin or alloys require a carbon-based conductive material to provide a high-capacity battery due to their low electronic conductivity.

For the conductive material, carbon-based conductive materials such as conductive carbon black have generally been used.

Particularly, carbon black in the form of very small nano-beads is agglomerated and has a large specific area and has generally been used for the conductive materials. However, carbon black is an electrostatic agglomerate of nano beads and therefore when interfaces between active material particles are large in accordance with electrode expansion during long cycles of charge and discharge, the agglomerate of carbon black particles may easily be separated and the conductive paths decrease, causing resistance in a battery and resulting in reduction of cycle-life. The conductive material has a sufficient contact with active material particles, and therefore, an increased amount of the conductive material is required.

SUMMARY OF THE INVENTION

One embodiment of the present invention provides an active material that may provide a rechargeable lithium battery having good cycle-life characteristics and/or high conductivity even when a small amount of conductive material is used.

Another embodiment of the present invention provides a rechargeable lithium battery having excellent rate and cycle-life characteristics.

According to an embodiment of the present invention, an active material for a rechargeable lithium battery is provided that includes an active material and a fiber-shaped or tube-shaped carbon conductive material attached to the surface of the active material.

According to another embodiment of the present invention, a rechargeable lithium battery is provided that includes a positive electrode, a negative electrode, and an electrolyte. At least one of the positive and negative electrodes includes the active material.

DETAILED DESCRIPTION

Figure 1:
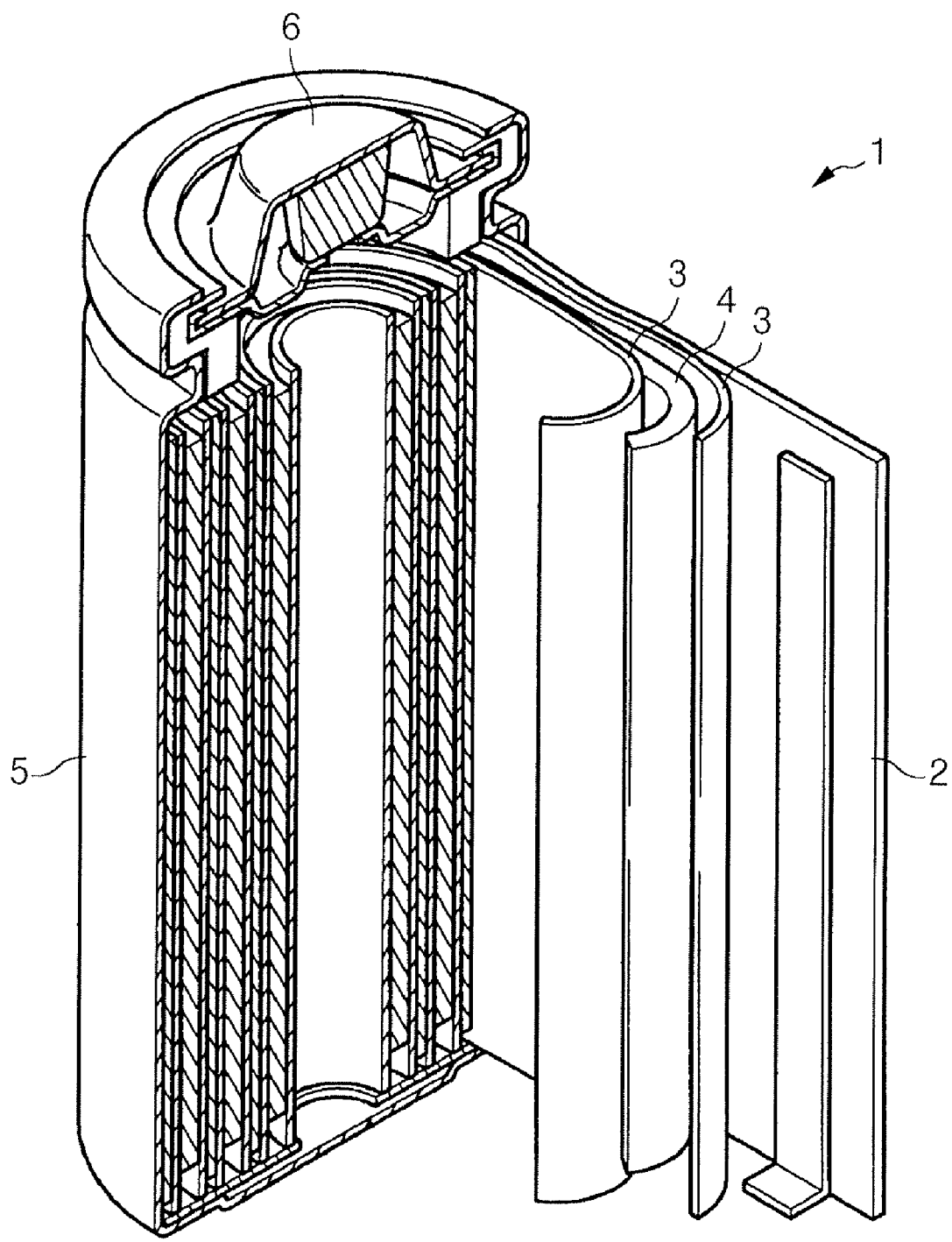
FIG. 1 is a schematic view of a rechargeable lithium battery according to one embodiment of the present invention.

The present invention relates to an active material having high conductivity for a rechargeable lithium battery that includes an active material surface-treated by a conductive material.

An electrode of a rechargeable lithium battery is generally fabricated as follows: an active material slurry including an active material, a conductive material, and a binder are mixed in an organic solvent, and then the slurry is coated on a current collector. The electrode fabricated as above includes a current collector, and an electrode active mass layer including the above positive active material, a conductive material, and a binder disposed on a current collector.

For the conductive material, carbon black in the form of very small nano beads is agglomerated and has a large specific surface area. However, the carbon black is an electrostatic agglomerate and thus the conductive network of the carbon black particles may be easily broken by electrode expansion resulting in an increase of cell resistance. In addition, a sufficient electronic conductive path is not realized at a particle surface and therefore a large amount of conductive material is required to obtain intended charge and discharge capacities.

On the contrary, according to one embodiment of the present invention, a conductive material is directly coated on a surface of an active material and thereby, the surface conductivity is improved. The conductive material includes a fiber-shaped or a tube-shaped carbon conductive material.

For a conductive material, a conventional carbon nanotube has been suggested in *Implementation of a Thick-Film Composite Li-Ion Microcathode Using Carbon Nanotubes as the Conductive Filler* (Qian Lin and John N. Harb, *Journal of the Electrochemical Society*, 151 8 A1115-A1119 2004). The disclosure relates to a microbattery, which is different from a rechargeable lithium battery of the present invention in terms of cell structure and operating mechanism.

In the case of a microbattery, compression is performed to ensure conductivity through a spot contact of conductive material particles such as graphite or carbon black. However, when a fiber-shaped conductive material such as carbon nanotube is used, compression need not be performed since the fiber-shaped conductive material contacts well even without compression. In a rechargeable lithium battery, compression is needed in order to obtain a high density battery and thus provide a high-capacity battery. In addition, the compression may be needed to obtain an electrode with an appropriate thickness. However, for the microbattery as disclosed in the above article, compression is not necessarily required if conductivity is ensured.

Furthermore, in the microbattery, a positive active material should be pulverized to a fine powder. Therefore, the specific surface area (BET) of a positive electrode is larger, and an excess amount of carbon nanotube is required. However, the excess amount of carbon nanotube cannot provide an electrode having a thickness of more than 100 μm. When the electrode has a thickness of 100 μm or more, sufficient adherence is not ensured even though a binder is used in an amount of 15 wt % or more, and cracks can form on the surface of the electrode.

As described above, the microbattery is thoroughly different from a rechargeable lithium battery in terms of a structure and operation. Furthermore, the purpose of using carbon nanotube and the effect thereof for a microbattery are different from those of the present invention. Therefore, the disclosed article fails to suggest the present invention to a person of ordinary skill in this art.

In *Journal of Power Sources* 119121 2003 770773 Roberto Dominko, a positive active material is disclosed including lithium cobalt oxide on the particle surface to which carbon black is attached to improve conductivity. The surface conductivity of positive active material may also be improved. However, it is expected that spot contact may be separated by electrode expansion during long charge and discharge cycles and thereby conductivity decrease cannot be suppressed.

The active material for a rechargeable lithium battery according to the present invention includes an active material and a fiber-shaped or tube-shaped carbon conductive material attached to the surface of the active material. The fiber-shaped or tube-shaped carbon conductive material may be attached to a portion of the active material surface or to the entire surface of the active material.

Such fiber-shaped or tube-shaped carbon conductive material is mixed with the active material and attached to the surface of the active material by a process that is simpler than a method of growing a fiber-shaped or tube-shaped carbon conductive material from the surface of the active material. In order to grow a fiber-shaped or tube-shaped carbon conductive material, heat-treatment should be performed under an atmosphere without oxygen. However, a non-carbon-based active material such as a metal or metal oxide undergoes deterioration due to a composition change thereof when it is heat-treated under an atmosphere without oxygen. According to the present invention, a heat treatment process need not be performed and therefore the above problem does not occur.

The fiber-shaped or tube-shaped carbon conductive material preferably includes carbon nano fibers or carbon nanotubes. When the carbon conductive material is not a fiber-shaped or tube-shaped material but a powder-type conductive material such as carbon black, surface cracks may occur and thus contact defects between particles may occur.

The fiber-shaped or tube-shaped carbon conductive material is oxidized by acid-treatment during the manufacturing process. Such oxidized fiber-shaped or tube-shaped carbon conductive material may suppress agglomeration during the coating of the active material and thereby improve surface conductivity of particles compared to a non-oxidized fiber-shaped or tube-shaped carbon conductive material.

The oxidized fiber-shaped or tube-shaped carbon conductive material includes functional groups selected from the group consisting of carboxyl groups (—COOH), hydroxyl groups (—OH), carbonyl groups (—COH), and combinations thereof that are attached to the surface thereof.

The fiber-shaped or tube-shaped carbon conductive material is present in an amount from 0.05 to 20 wt %, and preferably from 0.3 to 10 wt % based on the total weight of the active material.

When the amount of the conductive material is less than 0.05 wt %, sufficient conductivity cannot provided, whereas when it is more than 20 wt % active material adherence in the electrodes decreases.

The active material may include any positive or negative active material that is generally used for a rechargeable lithium battery. The conductive shell improves conductivity of a non-conductive non-carbon-based active material, and further improves conductivity of a carbon-based active material even more. Therefore, the conductive shell effect of the present invention may be maximized in the case of a non-conductive non-carbon-based active material.

Such an active material may be selected from the group consisting of carbonaceous materials, materials capable of reversibly forming lithium-containing compounds by reaction with lithium ions, lithium alloys, lithium-containing chalcogenide compounds, and combinations thereof.

The carbonaceous material may include crystalline carbon, amorphous carbon, or combinations thereof.

Materials capable of reversibly forming lithium-containing compounds by reaction with lithium ions include Si, Si oxide, Sn, Sn oxide, tin alloy composites, transition element oxides, lithium metal nitrides, and lithium metal oxides represented by the following Formula 1:

$$Li_xM_yV_zO_{2+d} \quad \text{Formula 1}$$

where $0.1 \leq x \leq 2.5$, $0 < y \leq 0.5$, $0.5 \leq z \leq 1.5$, $0 \leq d \leq 0.5$, and M is at least one element selected from the group consisting of Al, Cr, Mo, Ti, W, Zr, and combinations thereof.

The lithium alloys may include an alloy of lithium and a metal selected from the group consisting of Na, K, Rb, Cs, Fr, Be, Mg, Ca, Sr, Ba, Ra, Al, Fe, and Sn.

The lithium-containing chalcogenide compounds may be selected from the group consisting of compounds represented by the following Formulas 2 to 16:

$$LiAO_2 \quad \text{Formula 2}$$

$$LiMn_2O_4 \quad \text{Formula 3}$$

$$Li_aNi_bB_cM_dO_2 \ (0.95 \leq a \leq 1.1, 0 \leq b \leq 0.9, 0 \leq c \leq 0.5, 0.001 \leq d \leq 0.1) \quad \text{Formula 4}$$

$$Li_aNi_bCo_cMn_dM_eO_2 \ (0.95 \leq a \leq 1.1, 0 \leq b \leq 0.9, 0 \leq c \leq 0.5, 0 \leq d \leq 0.5, 0.001 \leq e \leq 0.1) \quad \text{Formula 5}$$

$$Li_aAM_bO_2 \ (0.95 \leq a \leq 1.1, 0.001 \leq b \leq 0.1) \quad \text{Formula 6}$$

$$Li_aMn_2M_bO_4 \ (0.95 \leq a \leq 1.1, 0.001 \leq b \leq 0.1) \quad \text{Formula 7}$$

$$DX_2 \quad \text{Formula 8}$$

$$LiDS_2 \quad \text{Formula 9}$$

$$V_2O_5 \quad \text{Formula 10}$$

$$LiV_2O_5 \quad \text{Formula 11}$$

$$LiEO_2 \quad \text{Formula 12}$$

$$LiNiVO_4 \quad \text{Formula 13}$$

$$Li_{3-x}F_2(PO_4)_3 \ (0 \leq x \leq 3) \quad \text{Formula 14}$$

$$Li_{3-x}Fe_2(PO_4)_3 \ (0.23 \ x \leq 2) \quad \text{Formula 15}$$

$$Li_aM'_bM''_c(PO_4)_d \ (0 < a < 3, 0 < b+c \leq 2, 0 < d \leq 3) \quad \text{Formula 16}$$

where in Formulas 2 to 16:

A is selected from the group consisting of Co, Ni, Mn, and combinations thereof, B is Co or Mn, D is Ti, Mo, or Mn, E is selected from the group consisting of Cr, V, Fe, Sc, Y, and combinations thereof, F is selected from the group consisting of V, Cr, M, Co, Ni, Cu, and combinations thereof, M is at least one transition element or lanthanide metal selected from the group consisting of Al, Cr, Mn, Fe, Mg, La, Ce, Sr, V, and combinations thereof, M' and M" are the same or different, and each is independently selected from the group consisting of Fe, Co, Ni, Mn, Cu, V, Sn, Ti, Cr, and combinations thereof, and X is O or S.

Hereinafter, a method of preparing the active material of the present invention is described.

First, an active material to which a water-soluble polymer is attached is added to a liquid of a fiber-shaped or tube-shaped carbon conductive material to obtain a mixture. The carbon conductive material is bound to the water-soluble polymer attached to the active material so that the carbon conductive material is bound to the surface of the active material.

The conductive material and active material are mixed in a weight ratio of 0.05 to 20:99.95 to 80. The concentration of the liquid of the conductive material may be controlled to be within an appropriate range.

The water-soluble polymer may be any water-soluble polymer having viscosity such as gelatin, polyvinylalcohol, or cellulose-based compounds. The cellulose-based compounds include carboxyl methyl cellulose, methyl cellulose, ethyl cellulose, hydroxy propyl methyl cellulose, hydroxy propyl ethyl cellulose, or salts thereof. The salt of the cellulose-based compound may be salts of alkaline metals such as Na, K, or Li.

The active material to which a water-soluble polymer is attached may be prepared by dipping an active material in a liquid containing the water-soluble polymer, and then drying the active material. An example of the liquid solvent for containing the water-soluble polymer is water, but it is not limited thereto. The concentration of the liquid of the water-soluble polymer is not specifically limited, but the amount of the water-soluble polymer is 5 wt % or less and preferably 2 wt % or less with respect to the weight of the active material. The amount of the active material, and the drying process may appropriately be controlled.

The liquid of the fiber-shaped or tube-shaped carbon conductive material is prepared by adding the fiber-shaped or tube-shaped carbon conductive material to a solvent. The liquid concentration may appropriately be controlled, and the solvent may include water or an organic solvent such as N-methylpyrrolidone, but it is not limited thereto.

In order to obtain good dispersion of the conductive material during preparation of the liquid of the carbon conductive material, the conductive material may be subjected to acid-treatment or a surfactant may be further added.

The acid-treatment may be performed by dipping the conductive material in acid such as sulfuric acid, hydrochloric acid, and so on to induce surface oxidation, which makes good dispersion in a solvent, particularly water.

Surfactants may include non-ionic, cationic, or anionic surfactants. Examples of cationic or anionic surfactants include sulfonate ($RSO_3^-$), sulfate ($RSO_4^-$), carboxylate ($RCOO^-$), phosphate ($RPO_4^-$), ammonium ($R_xH_yN_+$: where x ranges from 1 to 3, and y ranges from 3 to 1), quaternary ammonium ($R_4N^+$), betaine ($RN^+(CH_3)_2CH_2COO^-$), or sulfobetaine ($RN^+(CH_3)_2CH_2SO_3^-$), and examples of non-ionic surfactant include polyethyleneoxide ($R^{31}$ $OCH_2CH_2$ $(OCH_2CH_2)_nOH$), or amine compounds where R is a saturated or unsaturated hydrocarbon group. According to one embodiment of the present invention, the R is a $C_2$ to $C_{1000}$ saturated or unsaturated hydrocarbon group and the surfactant has a molecular weight ranging from 5 to 10000.

The amount of surfactant is appropriately controlled since it does not affect the effect of the present invention.

Subsequently, the pH of the resulting mixture is controlled within a range from 3 to 4. The pH may be controlled by adding an acid or a base. Examples include acetic acid, hydrochloric acid, sulfuric acid, ammonia, and so on.

The pH-controlled second mixture is then subjected to heat-treatment. The heat-treatment is performed at from 300 to 450° C. During the heat-treatment, the water-soluble polymer disposed between the active material and the carbon conductive material is decomposed and moisture is also removed, and therefore, the water-soluble polymer is not present in the resulting active material.

The entire preparation processes may be performed once, and then after completing the preparation processes, the preparation processes may be repeated using another carbon-based conductive material. That is to say, after the heat-treatment, a carbon conductive material is added to the resulting product to prepare a second mixture, the pH of the second mixture is controlled, and then heat-treated. Herein, the mixing ratio, addition amount, pH, and heat-treatment may be controlled as described above. The carbon-based conductive material may include carbon nano fibers, carbon nanotubes, carbon black, ketjen black, acetylene black, or activated carbon.

When the entire preparation processes are performed twice, the resulting active material includes from 0.05 to 20 wt % and preferably from 0.3 to 10 wt % of a conductive material.

An electrode is fabricated using the active material of the present invention as follows: an active material, a binder, and a solvent are mixed to prepare a slurry-type active material composition.

The binder attaches the active material particles to each other, and also attaches the active materials to a current collector. The binder may be any one or more of those generally-used materials for a rechargeable lithium battery. The binder includes an organic solvent-soluble binder or a water-soluble binder. Organic solvent-soluble binders include polytetrafluoroethylene, polyvinylidene fluoride, polyethylene, polypropylene, polyvinylchloride, polyvinylpyrrolidone, or polyvinylalcohol.

Water-soluble binders include styrene-butadiene rubber, sodium polyacrylate, copolymers of propylene and $C_2$ to $C_8$ olefins, or a copolymers of (meth)acrylic acid and alkylester (meth)acrylate.

When a water-soluble binder is used, a water-soluble thickener may also be used to improve the binding properties of the water-soluble binder. Water-soluble thickeners include cellulose-based compounds. Cellulose-based compounds include carboxylmethyl cellulose, hydroxypropyl cellulose, hydroxypropyl methyl cellulose, hydroxyethyl cellulose, hydroxypropyl ethyl cellulose, or methyl cellulose. An alkaline metal salt of the cellulose-based compound may also be used. Alkaline metals of the alkaline metal salt may include Na, K, Li, and so on. The alkaline metal salt of the cellulose-based compound may provide high rate discharge characteristics compared to the cellulose-based compound.

The active material composition is applied on a current collector, dried, and then compressed to fabricate an electrode. The current collector generally includes an Al foil or Cu foil.

A rechargeable lithium battery including the above described positive electrode includes a negative electrode and an electrolyte solution.

The electrolyte solution includes a non-aqueous organic solvent and a lithium salt. The non-aqueous organic solvent acts as a medium for transmitting ions taking part in the electrochemical reaction of the battery. The non-aqueous organic solvent may include a carbonate-based, ester-based, ether-based, or ketone-based solvent. Examples of carbonate-based solvents include dimethyl carbonate, diethyl carbonate, dipropyl carbonate, methylpropyl carbonate, ethylpropyl carbonate, methylethyl carbonate, ethylene carbonate, propylene carbonate, butylene carbonate or so on. Examples of ester-based solvents include γ-butyrolactone, n-methyl acetate, n-ethyl acetate, n-propyl acetate, and so on. Ether-based solvents include dibutyl ether and ketone-based solvents include polymethylvinyl ketone. Carbonate-based solvents include mixtures of a cyclic carbonate and a linear carbonate. The cyclic carbonate and the linear carbonate are mixed together in a volume ratio of 1:1 to 1:9, and when this mixture is used as an electrolyte, the electrolyte performance may be enhanced.

The non-aqueous organic solvent may also further include an aromatic hydrocarbon-based organic solvent that is mixed with a carbonate organic solvent. The aromatic hydrocarbon-based organic solvent may be represented by the following Formula 17:

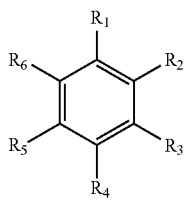

Formula 17 where $R_1$ to $R_6$ are the same or different and each is independently selected from the group consisting of halogens, nitro, $C_1$ to $C_{10}$ alkyls, and $C_1$ to $C_{10}$ haloalkyls, and q is an integer from 0 to 6.

Aromatic hydrocarbon-based organic solvents include benzene, fluoro benzene, chlorobenzene, nitro benzene, toluene, fluorotoluene, trifluorotoluene, xylene, and so on. When the electrolyte includes an aromatic hydrocarbon-based organic solvent, the carbonate solvent and aromatic hydrocarbon-based organic solvent are used in a volume ratio from 1:1 to 30:1. Within the above volume ratio, the electrolyte performance may be enhanced.

The lithium salt supplies lithium ions in the battery for operation of a rechargeable lithium battery, and facilitates transmission of lithium ions between positive and negative electrodes. Non-limiting examples of lithium salts include $LiPF_6$, $LiBF_4$, $LiSbF_6$, $LiAsF_6$, $LiClO_4$, $CF_3SO_3Li$, $LiN(SO_2CF_3)_2$, $LiC_4F_9SO_3$, $LiAlO_4$, $LiAlOCl_4$, $LiN(SO_2C_2F_5)_2$), $LiN(C_xF_{2x+1}SO_2)(C_yF_{2y+1}SO_2)$ (where x and y are natural numbers), LiCl, LiI, or combinations thereof.

The supporting electrolytic lithium salt may be used at a 0.1 to 2.0M concentration. When the lithium salt concentration is less than 0.1M, electrolyte performance may be deteriorated due to low electrolyte conductivity, whereas when it is more than 2.0M, lithium ion mobility may be reduced due to an increase of electrolyte viscosity.

FIG. 1 is a schematic cross-sectional view of a rechargeable lithium battery according to one embodiment of the present invention. Referring to FIG. 1, the cylindrical rechargeable lithium battery 1 is mainly constructed of a negative electrode 2, a positive electrode 4, a separator 3 interposed between the negative electrode 2 and the positive electrode 4, and an electrolyte in which the separator 3 is immersed, and also includes, a cell case 5 and a sealing member 6 sealing the cell case 5. The rechargeable lithium battery is not limited to the above structure, and thus the battery including a positive active material may be fabricated in a shape of prism, pouch, or so on.

The following examples illustrate the present invention in more detail. These examples, however, should not in any sense be interpreted as limiting the scope of the present invention.

EXAMPLE 1

A carbon nanotube conductive material was acid-treated by dipping in and out of a solution of sulfuric acid. The acid-treated carbon nanotube conductive material was put in deionized water to prepare a liquid of an oxidized carbon nanotube conductive material.

20 g of a lithium cobalt oxide active material was added to 100 ml of a gelatin aqueous solution in a concentration of 2 wt % and thereafter, filtered, preparing a lithium cobalt oxide coated with a gelatin layer.

The lithium cobalt oxide coated with a gelatin layer was added to the above liquid of the carbon nanotube conductive material and then, the combination was agitated. Herein, the lithium cobalt oxide was mixed with the carbon nanotube conductive material in a weight ratio of 96.5:0.5.

The acquired mixture was regulated to a pH from 3 to 4 by using acetic acid so that carbon nanotubes could be cohered together and adhered on the surface of the lithium cobalt oxide coated with a gelatin layer.

Then, the lithium cobalt oxide having carbon nanotubes on the surface was oxidized at about 400° C. to remove an amount of the gelatin and absorbed moisture, preparing an active material with a lithium cobalt oxide core and an oxidized carbon nanotube conductive shell formed around the lithium cobalt oxide core.

The active material was mixed with an N-methylpyrrolidone organic solvent. Then, a polyvinylidene fluoride binder was added thereto, preparing slurry. Herein, the active material was mixed with the binder in a ratio of 97:3 by wt. In the total mixture of the active material and the binder, a conductive material was included in an amount of 0.5 wt %. The prepared slurry was coated on an aluminum current collector and compressed, preparing a positive electrode. The positive electrode was used to fabricate a coin cell.

EXAMPLE 2

A coin cell was fabricated according to the same method as in Example 1 except that lithium cobalt oxide was mixed with a carbon nanotube conductive material in a weight ratio of 96.7:0.3.

EXAMPLE 3

A coin cell was fabricated according to the same method as in Example 1 except that lithium cobalt oxide was mixed with a carbon nanotube conductive material in a weight ratio of 96.9:0.1.

EXAMPLE 4

A coin cell was fabricated according to the same method as in Example 1 except that after a lithium cobalt oxide core with a carbon nanotube conductive shell was prepared at a weight ratio of 96.7:0.3, 0.2 wt % of carbon nanotube was added thereto again to prepare an active material having 0.5 wt % of a carbon nanotube conductive shell in total.

EXAMPLE 5

A coin cell was fabricated according to the same method as in Example 1 except that after a lithium cobalt oxide core with a carbon nanotube conductive shell was prepared at a weight ratio of 96.7:0.3, 0.2 wt % of carbon black was added thereto again to prepare an active material having 0.5 wt % of a carbon nanotube conductive shell in total.

EXAMPLE 6

A coin cell was fabricated according to the same method as in Example 1 except that a $LiFePO_4$ active material was used instead of a lithium cobalt oxide to prepare an active material, 97 parts by weight of the active material were mixed with 0.5 parts by weight of a carbon nanotube conductive material and 2.5 parts by weight of a polyvinylidene fluoride binder in an N-methylpyrrolidone solvent.

EXAMPLE 7

A coin cell was fabricated according to the same method as in Example except for the following changes; an active material was prepared by using $Li_{1.2}Mo_{0.06}V_{0.85}O_2$ instead of a lithium cobalt oxide. Then, 87 parts by weight of the active material was mixed with 5 parts by weight of a carbon nanotube conductive material and 8 parts by weight of a polyvinylidene fluoride binder to prepare an active material slurry. The slurry was coated on a copper current collector to prepare a negative electrode.

EXAMPLE 8

A coin cell was fabricated according to the same method as in Example 5 except for the following changes; an active material was prepared by using a silicon active material instead of a cobalt oxide. Then, 87 parts by weight of the active material was mixed with 5 parts by weight of a carbon nanotube conductive material and 8 parts by weight of a polyvinylidene fluoride binder to prepare an active material slurry. The slurry was coated on a copper current collector to prepare a negative electrode.

EXAMPLE 9

A coin cell was fabricated according to the same method as in Example 8 except for using an anatase-type $TiO_2$ active material and adding 1 part by weight of carbon nanotubes.

EXAMPLE 10

A negative active material was fabricated according to the same method as in Example 1 except for using graphite instead of a lithium cobalt oxide as an active material and copper as a current collector.

EXAMPLE 11

A coin cell was fabricated according to the same method as in Example 1 except for the following changes; an active material was prepared by using a graphite active material instead of a lithium cobalt oxide. Then, 97 parts by weight of the active material was mixed with 0.5 parts by weight of carbon nanotubes and 2.5 parts by weight of a polyvinylidene fluoride binder to prepare active material slurry, and the slurry was then coated on a copper current collector to prepare a negative electrode.

EXAMPLE 12

Si, Sn, Cu, and Al were treated in an arc melting method. According to the arc melting method, the materials were mixed under an argon gas atmosphere and thereafter, fused at 1500° C. or more. The prepared SiCuAl alloy was treated using a quenching ribbon coagulation method, and an active material was prepared including Si inside a Cu—Al matrix. Herein, the quenching speed (i.e., spinning speed of a Copper roll) was 3000 rpm.

The negative active material included 40 parts by weight of Si, 10 parts by weight of Sn, 44.15 parts by weight of Cu, and 5.852 parts by weight of Al.

The active material was used to prepare negative active material according to the same method as in Example 1. However, the oxidation process at 400° C. was performed under an Ar non-active atmosphere at 400° C.

EXAMPLE 13

A coin cell was fabricated according to the same method as in Example 1 except for using a $Li_{1.1}VO_2$ lithium vanadium oxide active material instead of a lithium cobalt oxide active material.

EXAMPLE 14

A coin cell was fabricated according to the same method as in Example 13 except for using a $Li_{1.08}Mo_{0.02}VO_{0.9}O_2$ lithium vanadium oxide active material instead of a $LiVO_2$ lithium vanadium oxide active material.

EXAMPLE 15

A coin cell was fabricated according to the same method as in Example 13 except for using a $Li_{1.08}V_{0.9}O_2$ lithium vanadium oxide active material instead of a $LiVO_2$ lithium vanadium active material.

EXAMPLE 16

A coin cell was fabricated according to the same method as in Example 1 except for using a mixed active material including 28.5 parts by weight of a $Li_{1.08}V_{0.9}O_2$ lithium vanadium oxide and 66.5 parts by weight of artificial graphite instead of a lithium cobalt oxide active material.

Then, the negative active materials prepared according to Examples 1 to 16 were examined and were shown to include carbon nanotubes adhered on the surface and also, carboxyl groups, carbonyl groups, and hydroxyl groups adhered on the surface of the conductive material.

COMPARATIVE EXAMPLE 1

0.5 wt % of carbon black was used to prepare an active material coated with carbon black according to the same method as in Example 1.

COMPARATIVE EXAMPLE 2

A lithium cobalt oxide was mixed with a carbon black conductive material and a polyvinylidene fluoride binder in an N-methyl pyrrolidone solvent. Herein, their mixing weight ratio was 96.5:0.5:3 by weight.

The slurry was used to prepare a positive electrode according to the same method as in Example 1.

COMPARATIVE EXAMPLE 3

A positive electrode was prepared according to the same method as in Comparative Example 2 except that carbon black was included in an amount of parts by weight.

COMPARATIVE EXAMPLE 4

0.3 wt % of carbon black was coated on the surface of a lithium cobalt oxide according to the same method as in Example 1, preparing a lithium cobalt oxide coated with carbon black. 96.5 parts by weight of the lithium cobalt oxide coated with carbon black was mixed with 0.2 parts by weight of carbon black and 3 parts by weight of a polyvinylidene fluoride binder in an N-methyl pyrrolidone, preparing slurry. The slurry was used to prepare a positive electrode according to the same method as in Example 1.

COMPARATIVE EXAMPLE 5

A positive electrode was prepared according to the same method as in Comparative Example 1 except for preparing a LiFePO$_4$ active material coated with carbon black by using a LiFePO$_4$ active material instead of a lithium cobalt oxide and thereafter, preparing a slurry by mixing 96.5 parts by weight of the active material, 0.5 parts by weight of carbon black, and 3 parts by weight of a polyvinylidene fluoride binder.

Comparative Example 6

A Li$_{1.2}$Mo$_{0.06}$V$_{0.85}$O$_2$ active material was coated with carbon black, preparing an active material coated with carbon black.

A coin cell was prepared according to the same method as in Example 1 except that 87 parts by weight of the active material coated with carbon black was mixed with 5 parts by weight of a carbon black conductive material and 8 parts by weight of a binder in an N-methyl pyrrolidone solvent, preparing slurry and the slurry was then coated on a copper current collector.

COMPARATIVE EXAMPLE 7

A negative active material was prepared according to the same method as in Example 5 except that an active material coated with carbon black was prepared by using a silicon active material, and then, 87 parts by weight of the active material coated with carbon black was mixed with 5 parts by weight a carbon black conductive material and 8 parts by weight of a binder to prepare slurry.

COMPARATIVE EXAMPLE 8

A negative active material was prepared according to the same method as in Example 8, except that a TiO$_2$-anatase active material having a carbon black conductive shell was prepared by using an anatase-type TiO$_2$ active material and 1 wt % of a carbon black and then, adding 1 part by weight of carbon black thereto, so that conductive material might be included in a total amount of 2 wt %.

COMPARATIVE EXAMPLE 9

A negative active material was prepared according to the same method as in comparative Example 1 except for using graphite instead of carbon black.

COMPARATIVE EXAMPLE 10

An active material was prepared by using graphite instead of carbon black according to the same method as in Comparative Example 1. Then, a negative active material was prepared according to the same method as in Example 1 except that 96.5 parts by weight of the active material was mixed with 0.5 parts by weight of carbon nanotube and 3 parts by weight of a polyvinylidene fluoride binder to prepare a slurry.

COMPARATIVE EXAMPLE 11

An active material prepared according to Example 12 was used as a negative active material.

Figure 2:
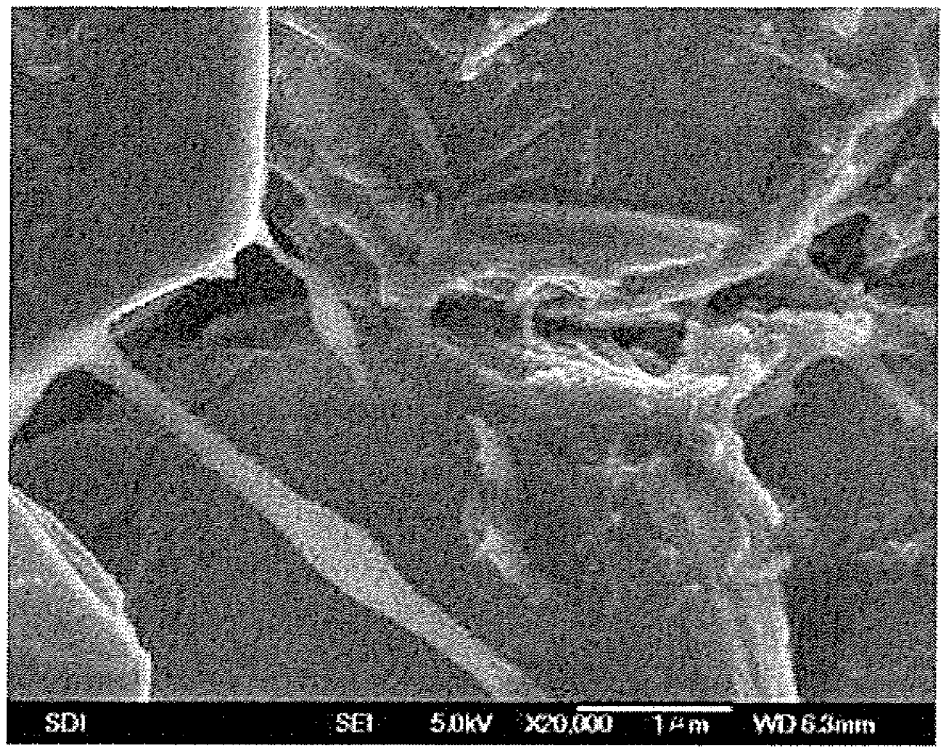
FIG. 2 is a SEM photograph of an electrode surface of the coin cell according to Example 1 of the present invention after 40 charge and discharge cycles.
Figure 3:
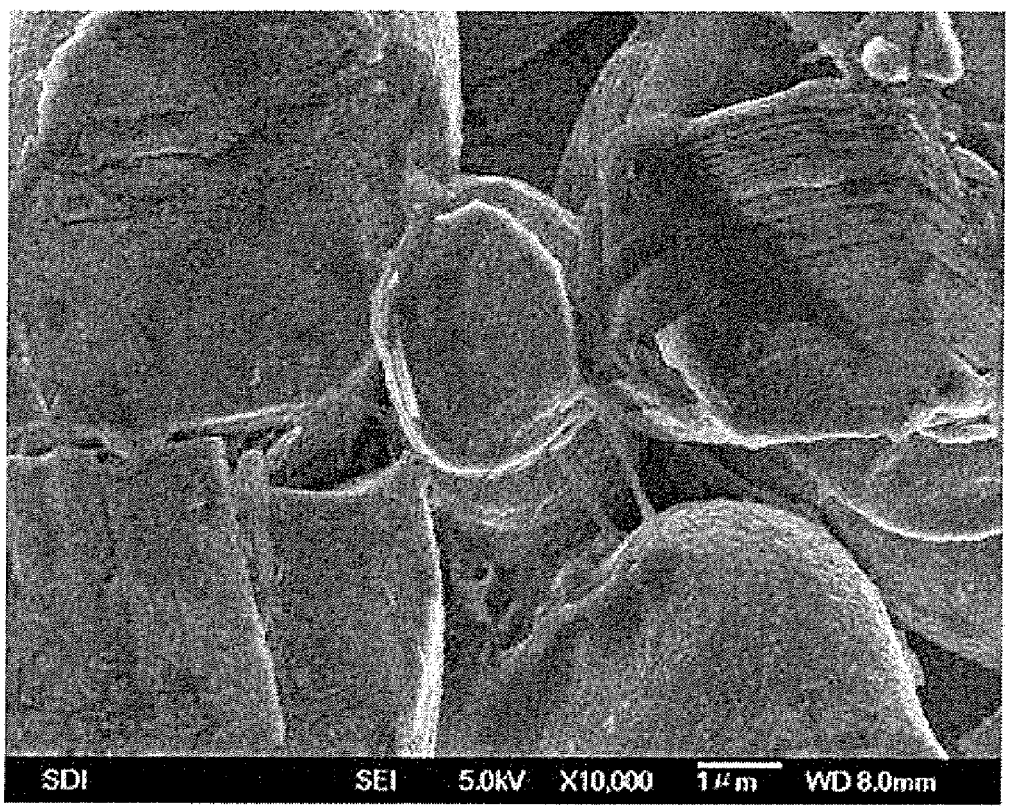
FIG. 3 is a SEM photograph of an electrode surface of the coin cell according to Example 2 of the present invention after 40 charge and discharge cycles.
Figure 4:
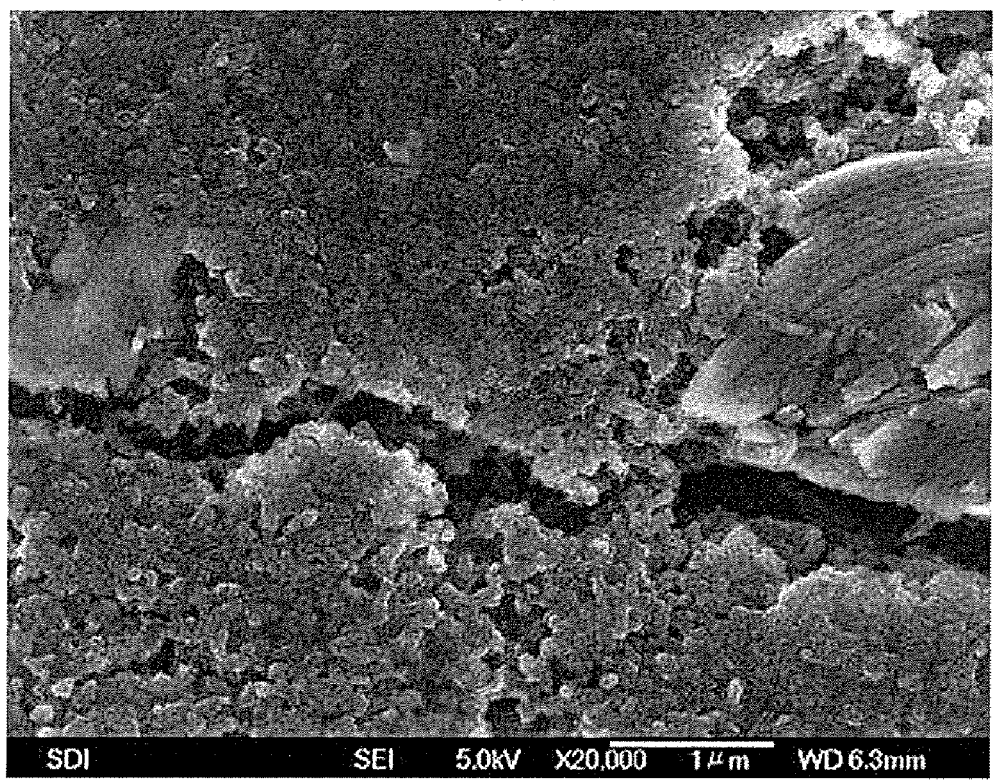
FIG. 4 is a SEM photograph of an electrode surface of the coin cell according to Comparative Example 1 after 40 charge and discharge cycles.

Then, the coin cells according to Examples 1 to 2 and Comparative Example 1 were charged and discharged 40 times. Their substrates after the charges and discharges were photographed by a SEM. FIGS. 2 to 4 respectively show the results. As shown in FIGS. 2 to 4, the coin cells according to Examples 1 and 2 maintained conductive networks among the surface of active materials. However, the one of Comparative Example 1 had a crack, leading to contact defects among particles.

Next, the coin cells according to Examples 1 to 12 and Comparative Examples 1 to 11 were examined regarding discharge capacity, 1st charge and discharge efficiency, and 50th cycle-life efficiency characteristic. The results are shown in the following Table 1.

TABLE 1

|  | Discharge capacity (mAh/g) | 1$^{st}$ charge and discharge efficiency (%) | 50$^{th}$ cycle-life efficiency (%) |
| --- | --- | --- | --- |
| Example 1 | 159 | 98 | 91 |
| Example 2 | 151 | 96 | 85 |
| Example 3 | 138 | 91 | 72 |
| Example 4 | 158 | 97.5 | 93 |
| Example 5 | 157 | 98 | 90 |
| Example 6 | 154 | 97.3 | 89 |
| Example 7 | 265 | 83 | 88 |
| Example 8 | 1046 | 78 | 68 |
| Example 9 | 153 | 87 | 91 |
| Example 10 | 355 | 95 | 91 |
| Example 11 | 357 | 96 | 93 |
| Example 12 | — | 90% | 80% |
| Comparative Example 1 | 158 | 97.5 | 73 |
| Comparative Example 2 | 147 | 94 | 60 |
| Comparative Example 3 | 114 | 86 | 35 |
| Comparative Example 4 | 158 | 98 | 78 |
| Comparative Example 5 | 152 | 96.5 | 69 |
| Comparative Example 6 | 251 | 78 | 45 |
| Comparative Example 7 | 1028 | 57 | 32 |
| Comparative Example 8 | 151 | 82 | 78 |
| Comparative Example 9 | 354 | 94 | 79 |
| Comparative Example 10 | 356 | 93 | 84 |
| Comparative Example 11 | — | 82 | 68 |

As shown in Table 1, the coin cells according to Examples 1 to 12 had a positive or negative active material electro-conductive channel with low conductivity, which is formed by oxidized nanotube or nanofiber coated on the surface of the positive or negative active material and accordingly, had higher discharge capacity than the ones of Comparative Examples 2 to 5 and 9.

In addition, in case that coin cells in general might have a crack due to expansion of an active material, the coin cells of Comparative Examples 1, 6 to 8, and 10 included an active material coated with carbon black and thereby, it might be hard to maintain the shape of electro-conductive networks formed of static-electric coagulation of nano beads. Even the electro-conductive networks could easily break off, failing in securing good cycle-life efficiency.

However, since the coin cells according to Examples 1 to 12 included an active material coated with nano fiber or nanotube, they could maintain a channel among active material particles, even when fibers (or tubes) connecting active material particles were widened. Based on these characteristics, they could maintain electro-conductivity inside a substrate that may suppress resistances even if their cycle-life increased and thereby, have improved cycle-life efficiency.

Furthermore, the coin cells according to Examples 14 to 16 showed similar results to the ones according to Examples 1 to 12.

As described above, the active material may include a conductive shell including a fiber-shaped or tube-shaped carbon conductive material, resulting in increased discharge capacity due to improved conductivity and/or improved cycle-life efficiency by maintaining paths between active material particles during charge and discharge cycles.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An improved active material for a rechargeable lithium battery, comprising:
   an active material selected from the group consisting of lithium alloys, lithium-containing chalcogenide compounds, and combinations thereof; and
   a fiber-shaped or tube-shaped carbon conductive material directly coated on a first portion of a surface of the active material leaving a second portion of the surface of the active material uncoated, wherein the fiber-shaped or tube-shaped carbon conductive material is oxidized at its surface.

2. The improved active material of claim 1, wherein the oxidized conductive material is oxidized at its surface to form functional groups selected from the group consisting of carboxyl groups, hydroxyl groups, carbonyl groups, and combinations thereof.

3. The improved active material of claim 1, wherein the carbon conductive material is present in an amount from 0.05 to 20 wt % based on the total weight of the active material.

4. The improved active material of claim 3, wherein the carbon conductive material is present in an amount from 0.3 to 10 wt % based on the total weight of the active material.

5. The improved active material of claim 1, wherein the active material comprises a lithium-containing chalcogenide compound selected from the group consisting of compounds represented by one of Formulas 2 to 16:

$LiAO_2$  Formula 2

$LiMn_2O_4$  Formula 3

$Li_aNi_bB_cM_dO_2$ where $0.95 \leq a \leq 1.1$, $0 \leq b \leq 0.9$, $0 \leq c \leq 0.5$, and $0.001 \leq d \leq 0.1$  Formula 4

$Li_aNi_bCo_cMn_daM_eO_2$ where $0.95 \leq a \leq 1.1$, $0 \leq b \leq 0.9$, $0 \leq c \leq 0.5$, $0 \leq d \leq 0.5$, and $0.001 \leq e 0.1$  Formula 5

$Li_aAM_bO_2$ where $0.95 \leq a \leq 1.1$, and $0.001 \leq b \leq 0.1$  Formula 6

$Li_aMn_2M_bO_4$ where $0.95 \leq a \leq 1.1$, and $0.001 \leq b \leq 0.1$  Formula 7

$DX_2$  Formula 8

$LiDS_2$  Formula 9

$V_2O_5$  Formula 10

$LiV_2O_5$  Formula 11

$LiEO_2$  Formula 12

$LiNiVO_4$  Formula 13

$Li_{3-x}F_2(PO_4)_3$ where $0 \leq x \leq 3$  Formula 14

$Li_{3-x}Fe_2(PO_4)_3$ where $0 \leq x \leq 2$  Formula 15

$Li_aM'_bM''_c(PO_4)_d$ where $0 < a < 3$, $0 < b+c \leq 2$, and $0 < d << 3$  Formula 16 where, in each of Formulas 2 to 16,
   A is selected from the group consisting of Co, Ni, Mn, and combinations thereof,
   B is Co or Mn,
   D is Ti, Mo, or Mn,
   E is selected from the group consisting of Cr, V, Fe, Sc, Y, and combinations thereof,
   F is selected from the group consisting of V, Cr, M, Co, Ni, Cu, and combinations thereof,
   M is at least one transition element or lanthanide metal selected from the group consisting of Al, Cr, Mn, Fe, Mg, La, Ce, Sr, V, and combinations thereof,
   M' and M" are the same or different, and are selected from the group consisting of Fe, Co, Ni, Mn, Cu, V, Sn, Ti, Cr, and combinations thereof, and
   X is O or S.

6. The improved active material of claim 1, wherein the active material is prepared by:
   adding an active material to which a water-soluble polymer is attached to a liquid comprising a carbon conductive material comprising an oxidized carbon nano fiber or carbon nanotube conductive material to obtain a mixture;
   controlling the pH of the mixture; and
   heat-treating the mixture.

7. The improved active material of claim 6, wherein the carbon conductive material and active material are mixed in a weight ratio from 0.05 to 20:99.95 to 80.

8. The improved active material of claim 6, wherein the pH is controlled within a range from 3 to 4.

9. The improved active material of claim 6, wherein the heat-treating process is performed at from 300 to 450° C.

10. The improved active material of claim 6, wherein the active material is prepared by a method which further comprises:
   mixing the product obtained by heat-treating with a carbon conductive material to obtain a second mixture;
   controlling the pH of the second mixture; and
   heat-treating the second mixture.

11. The improved active material of claim 10, wherein the pH is controlled within a range from 3 to 4.

12. The improved active material of claim 10, wherein the heat-treating is performed at from 300 to 450° C.

13. The improved active material of claim 10, wherein the carbon conductive material is selected from the group consisting of carbon nano fiber, carbon nanotube, carbon black, ketjen black, acetylene black, and activated carbon.

14. An improved active material for a rechargeable lithium battery, comprising:
   an active material selected from the group consisting of lithium alloys, lithium-containing chalcogenide compounds, and combinations thereof; and
   a fiber-shaped or tube-shaped carbon conductive material directly coated over the entire surface of the active material, wherein the fiber-shaped or tube-shaped carbon conductive material is oxidized at its surface.

15. The improved active material of claim 14, wherein the oxidized conductive material is oxidized at its surface to form functional groups selected from the group consisting of carboxyl groups, hydroxyl groups, carbonyl groups, and combinations thereof.

16. The improved active material of claim 14, wherein the carbon conductive material is present in an amount from 0.05 to 20 wt % based on the total weight of the active material.

17. The improved active material of claim 16, wherein the carbon conductive material is present in an amount from 0.3 to 10 wt % based on the total weight of the active material.

18. The improved active material of claim 14, wherein the active material comprises a lithium-containing chalcogenide compound selected from the group consisting of compounds represented by one of Formulas 2 to 16:

$LiAO_2$  Formula 2

$LiMn_2O_4$  Formula 3

$Li_aNi_bB_cM_dO_2$ where $0.95 \leq a \leq 1.1$, $0 \leq b \leq 0.9$, $0 \leq c \leq 0.5$, and $0.001 \leq d \leq 0.1$  Formula 4

$Li_aNi_bCo_cMn_dM_eO_2$ where $0.95 \leq a \leq 1.1$, $0 \leq b \leq 0.9$, $0 \leq c \leq 0.5$, $0 \leq d \leq 0.5$, and $0.001 \leq e 0.1$  Formula 5

$Li_aAM_bO_2$ where $0.95 \leq a \leq 1.1$, and $0.001 \leq b \leq 0.1$  Formula 6

$Li_aMn_2M_bO_4$ where $0.95 \leq a \leq 1.1$, and $0.001 \leq b \leq 0.1$  Formula 7

$DX_2$  Formula 8

$LiDS_2$  Formula 9

$V_2O_5$  Formula 10

$LiV_2O_5$  Formula 11

$LiEO_2$  Formula 12

$LiNiVO_4$  Formula 13

$Li_{3-x}F_2(PO_4)_3$ where $0 \leq x \leq 3$  Formula 14

$Li_{3-x}Fe_2(PO_4)_3$ where $0 \leq x \leq 2$  Formula 15

$Li_aM'_bM''_c(PO_4)_d$ where $0 \leq a \leq 3$, $0 \leq b+c \leq 2$, and $0 \leq d \leq 3$  Formula 16 where, in each of Formulas 2 to 16,
A is selected from the group consisting of Co, Ni, Mn, and combinations thereof,
B is Co or Mn,
D is Ti, Mo, or Mn,
E is selected from the group consisting of Cr, V, Fe, Sc, Y, and combinations thereof,
F is selected from the group consisting of V, Cr, M, Co, Ni, Cu, and combinations thereof,
M is at least one transition element or lanthanide metal selected from the group consisting of Al, Cr, Mn, Fe, Mg, La, Ce, Sr, V, and combinations thereof,
M' and M" are the same or different, and are selected from the group consisting of Fe, Co, Ni, Mn, Cu, V, Sn, Ti, Cr, and combinations thereof, and
X is O or S.

* * * * *